(12) United States Patent
Nakao et al.

(10) Patent No.: US 8,850,376 B2
(45) Date of Patent: Sep. 30, 2014

(54) METHOD, DEVICE, AND A COMPUTER-READABLE RECORDING MEDIUM HAVING STORED PROGRAM FOR INFORMATION PROCESSING FOR NOISE SUPPRESSION DESIGN CHECK

(71) Applicant: Fujitsu Limited, Kawasaki (JP)

(72) Inventors: Tomoyuki Nakao, Yokohama (JP); Yoshiaki Hiratsuka, Ota (JP); Keisuke Nakamura, Tachikawa (JP); Yoshihiro Sawada, Inagi (JP); Kenji Nagase, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/849,706

(22) Filed: Mar. 25, 2013

(65) Prior Publication Data
US 2013/0326452 A1 Dec. 5, 2013

(30) Foreign Application Priority Data
May 31, 2012 (JP) ................................. 2012-125398

(51) Int. Cl.
*G06F 17/50* (2006.01)
(52) U.S. Cl.
CPC ........ *G06F 17/5081* (2013.01); *G06F 2217/82* (2013.01)
USPC .............................. 716/115; 716/111; 716/136
(58) Field of Classification Search
CPC ............ G06F 17/5036; G06F 17/5077; G06F 17/5068; G06F 17/5081; G06F 17/5022; G06F 17/5031; G06F 17/505; G06F 2217/82
USPC .......................................... 716/111, 115, 136
See application file for complete search history.

(56) References Cited

U.S. PATENT DOCUMENTS

| | | | |
|---|---|---|---|
| 2001/0044709 A1* | 11/2001 | Fujimori et al. | 703/2 |
| 2002/0007253 A1* | 1/2002 | Yamashita et al. | 702/111 |
| 2003/0233193 A1* | 12/2003 | Nagata et al. | 702/13 |
| 2010/0275172 A1 | 10/2010 | Yaguchi | |

FOREIGN PATENT DOCUMENTS

| | | |
|---|---|---|
| JP | 6-325109 | 11/1994 |
| JP | 2002-032428 | 1/2002 |
| JP | 2005-223120 | 8/2005 |
| JP | 2006-172370 | 6/2006 |
| JP | 2008-181353 | 8/2008 |
| JP | 2010-257098 | 11/2010 |
| JP | 2011-8664 | 1/2011 |

* cited by examiner

*Primary Examiner* — Vuthe Siek
(74) *Attorney, Agent, or Firm* — Staas & Halsey LLP

(57) ABSTRACT

A computer-readable recording medium having stored therein a program for causing a computer to execute a process for information processing comprising: performing, for a plurality of noise countermeasure design checks for a plurality of nets provided on a substrate, an initial noise countermeasure design check on each of the plurality of nets in an execution order determined, when one of the checks is passed, on the basis of other noise countermeasure design checks that may be skipped; and performing, if it is determined on the basis of at least a check result of a noise countermeasure design check which has been performed immediately before a corresponding check that there is a next noise countermeasure design check that may not be skipped in the execution order, the next noise countermeasure design check for each of the plurality of nets.

10 Claims, 19 Drawing Sheets

FIG. 1
RELATED ART

|  | CHECK 1 | CHECK 2 | CHECK 3 | CHECK 4 | CHECK 5 |
|---|---|---|---|---|---|
| NET001 |  |  |  |  |  |
| NET002 |  |  |  |  |  |
| NET003 |  |  |  |  |  |
| NET004 |  |  |  |  |  |
| NET005 |  |  |  |  |  |
| NET006 |  |  |  |  |  |
| ⋮ |  |  |  |  |  |
| NET1000 |  |  |  |  |  |

FIG. 2
RELATED ART

|  | CHECK 1 | CHECK 2 | CHECK 3 | CHECK 4 | CHECK 5 | EVALUATION SCORE |
|---|---|---|---|---|---|---|
| NET001 | OK | ERR 5 POINTS | OK | OK | OK | 5 |
| NET002 | OK | OK | ERR 10 POINTS | OK | ERR 10 POINTS | 20 |
| NET003 | ERR 10 POINTS | OK | OK | OK | OK | 10 |
| NET004 | ERR 10 POINTS | ERR 5 POINTS | OK | OK | OK | 15 |
| NET005 | ERR 10 POINTS | ERR 5 POINTS | ERR 6 POINTS | ERR 7 POINTS | OK | 28 |
| NET006 | OK | OK | OK | OK | OK | 0 |
| ⋮ | ⋮ | ⋮ | ⋮ | ⋮ | ⋮ | ⋮ |
| NET1000 | OK | OK | OK | OK | OK | 0 |

FIG. 3

| OK \ SKIP | CHECK 1<br>INNER LAYER | CHECK 2<br>SURFACE PATTERN LENGTH | CHECK 3<br>COUNTER-MEASURE COMPONENT DISTANCE | CHECK 4<br>GUARD | CHECK 5<br>SUBSTRATE END |
|---|---|---|---|---|---|
| CHECK 1<br>INNER LAYER | | × | × | ○ | × |
| CHECK 2<br>SURFACE PATTERN LENGTH | — | | × | × | ○ |
| CHECK 3<br>COUNTER-MEASURE COMPONENT DISTANCE | — | — | | × | ○ |
| CHECK 4<br>GUARD | — | — | — | | × |
| CHECK 5<br>SUBSTRATE END | — | — | — | — | |

FIG. 8

| CHECK ITEM / NET NAME | CHECK 1 INNER LAYER | CHECK 2 SURFACE PATTERN LENGTH | CHECK 3 COUNTERMEASURE COMPONENT DISTANCE | CHECK 4 GUARD | CHECK 5 SUBSTRATE END |
|---|---|---|---|---|---|
| NET001 | | | | | |
| NET002 | | | | | |
| NET003 | | | | | |
| NET004 | | | | | |
| NET005 | | | | | |
| NET006 | | | | | |
| NET007 | | | | | |

FIG. 9

| CHECK ITEM / NET NAME | CHECK 1 INNER LAYER | CHECK 2 SURFACE PATTERN LENGTH | CHECK 3 COUNTERMEASURE COMPONENT DISTANCE | CHECK 4 GUARD | CHECK 5 SUBSTRATE END |
|---|---|---|---|---|---|
| NET001 | 23% OK | 0% | 0% | | 0% |
| NET002 | 18% OK | 0% | 0% | | 0% |
| NET003 | 66% | | | | |
| NET004 | 82% | | | | |
| NET005 | 78% | | | | |
| NET006 | 35% OK | 0% | 0% | | 0% |
| NET007 | 19% OK | 0% | 0% | | 0% |

FIG. 10

| CHECK ITEM / NET NAME | CHECK 1 INNER LAYER | CHECK 2 SURFACE PATTERN LENGTH | CHECK 3 COUNTERMEASURE COMPONENT DISTANCE | CHECK 4 GUARD | CHECK 5 SUBSTRATE END |
|---|---|---|---|---|---|
| NET001 | 23% OK | 0% | 0% | | 0% |
| NET002 | 18% OK | 0% | 0% | | 0% |
| NET003 | 66% | 22% OK | 0% | 0% | |
| NET004 | 82% | 88% | | | |
| NET005 | 78% | 69% | | | |
| NET006 | 35% OK | 0% | 0% | | 0% |
| NET007 | 19% OK | 0% | 0% | | 0% |

FIG. 11

| CHECK ITEM / NET NAME | CHECK 1 INNER LAYER | CHECK 2 SURFACE PATTERN LENGTH | CHECK 3 COUNTERMEASURE COMPONENT DISTANCE | CHECK 4 GUARD | CHECK 5 SUBSTRATE END |
|---|---|---|---|---|---|
| NET001 | 23% OK | 0% | 0% | | 0% |
| NET002 | 18% OK | 0% | 0% | | 0% |
| NET003 | 66% | 22% OK | 0% | 0% | |
| NET004 | 82% | 88% | 20% OK | 0% | |
| NET005 | 78% | 69% | 100% | | |
| NET006 | 35% OK | 0% | 0% | | 0% |
| NET007 | 19% OK | 0% | 0% | | 0% |

FIG. 12

| CHECK ITEM / NET NAME | CHECK 1 INNER LAYER | CHECK 2 SURFACE PATTERN LENGTH | CHECK 3 COUNTERMEASURE COMPONENT DISTANCE | CHECK 4 GUARD | CHECK 5 SUBSTRATE END |
|---|---|---|---|---|---|
| NET001 | 23% OK | 0% | 0% | 16% OK | 0% |
| NET002 | 18% OK | 0% | 0% | 12% OK | 0% |
| NET003 | 66% | 22% OK | 0% | 0% | |
| NET004 | 82% | 88% | 20% OK | 0% | |
| NET005 | 78% | 69% | 100% | 96% | |
| NET006 | 35% OK | 0% | 0% | 22% OK | 0% |
| NET007 | 19% OK | 0% | 0% | 32% OK | 0% |

FIG. 13

| CHECK ITEM / NET NAME | CHECK 1 INNER LAYER | CHECK 2 SURFACE PATTERN LENGTH | CHECK 3 COUNTERMEASURE COMPONENT DISTANCE | CHECK 4 GUARD | CHECK 5 SUBSTRATE END |
|---|---|---|---|---|---|
| NET001 | 23% OK | 0% | 0% | 16% OK | 0% |
| NET002 | 18% OK | 0% | 0% | 12% OK | 0% |
| NET003 | 66% | 22% OK | 0% | 0% | 45% |
| NET004 | 82% | 88% | 20% OK | 0% | 28% OK |
| NET005 | 78% | 69% | 100% | 96% | 22% OK |
| NET006 | 35% OK | 0% | 0% | 22% OK | 0% |
| NET007 | 19% OK | 0% | 0% | 32% OK | 0% |

FIG. 14

| CHECK ITEM / NET NAME | CHECK 1 INNER LAYER | CHECK 2 SURFACE PATTERN LENGTH | CHECK 3 COUNTERMEASURE COMPONENT DISTANCE | CHECK 4 GUARD | CHECK 5 SUBSTRATE END | TOTAL |
|---|---|---|---|---|---|---|
| NET001 | 23% OK | 0% | 0% | 16% OK | 0% | 39 pts. |
| NET002 | 18% OK | 0% | 0% | 12% OK | 0% | 30 pts. |
| NET003 | 66% | 22% OK | 0% | 0% | 45% | 133 pts. |
| NET004 | 82% | 88% | 20% OK | 0% | 28% OK | 218 pts. |
| NET005 | 78% | 69% | 100% | 96% | 22% OK | 365 pts. |
| NET006 | 35% OK | 0% | 0% | 22% OK | 0% | 57 pts. |
| NET007 | 19% OK | 0% | 0% | 32% OK | 0% | 51 pts. |

FIG. 15

| NET NAME | TOTAL |
|---|---|
| NET005 | 365 pts. |
| NET004 | 218 pts. |
| NET003 | 133 pts. |
| NET006 | 57 pts. |
| NET007 | 51 pts. |
| NET001 | 39 pts. |
| NET002 | 30 pts. |

METHOD, DEVICE, AND A COMPUTER-READABLE RECORDING MEDIUM HAVING STORED PROGRAM FOR INFORMATION PROCESSING FOR NOISE SUPPRESSION DESIGN CHECK

CROSS-REFERENCE TO RELATED APPLICATION

This application is based upon and claims the benefit of priority of the prior Japanese Patent Application No. 2012-125398, filed on May 31, 2012, the entire contents of which are incorporated herein by reference.

FIELD

The embodiments discussed herein are related to a check technique for electromagnetic compatibility (EMC) countermeasure design.

BACKGROUND

A large scale integrated circuit (LSI) mounted on a printed circuit board generates noise, and an interconnection pattern radiates noise electromagnetic waves. Also, when the interconnection pattern receives noise such as static electricity and the like, the noise may be a cause of a malfunction in the LSI. In order to reduce the amount of radiation of electromagnetic waves and malfunctions caused by noise, EMC countermeasure design is conducted, and there are EMC design check systems used for checking design quality. The term "EMC design check" means check performed to detect whether or not there is a net from which a great amount of electromagnetic wave is likely to be radiated. An EMC countermeasure is performed on the net detected by the check to reduce the amount of radiated electromagnetic wave, thus reducing the occurrence of a malfunction of the LSI.

In the related art, each net relating to EMC is scored for various elements on the basis of position coordinates and product information as information of computer aided design (CAD), and prioritizing is performed using a total score. For example, as illustrated in FIG. 1, when 1000 nets, that is, NET 001 to NET 1000, are checked for five elements of Check 1 to Check 5, 5000 times (5×1000=5000) of checks are performed. Then, points are given, for example, such that, if there is no problem (or a check is passed) in Check 1 to Check 5, 0 points are given, if there is a problem in Check 1, 10 points are given, if there is a problem in Check 2, 5 points are given, if there is a problem in Check 3, 10 points are given, if there is a problem in Check 4, 7 points are given, and if there is a problem in Check 5, 10 points are given. Thus, for example, as illustrated in FIG. 2, results of 5000 checks are registered in a table, and the total of scored points (an evaluation score) is calculated for each net. When nets are arranged in a descending order of the evaluation score, a net on which a countermeasure is to be performed may be selected. However, even when an evaluation score is lower than a threshold, there might be cases where, if the evaluation score is lower only by a few points than a threshold, it is determined that a countermeasure is to be performed on the evaluation score. Thus, there might be cases where net selection may not be performed in a uniform manner.

In the above-described example, the number of nets is only 1000. However, in actual cases, checks are performed on even more nets, and thus, a time spent for an entire check is disadvantageously long.

Japanese Laid-open Patent Publication No. 2010-257098, Japanese Laid-open Patent Publication No. 06-325109, Japanese Laid-open Patent Publication No. 2011-8664, Japanese Laid-open Patent Publication No. 2008-181353, Japanese Laid-open Patent Publication No. 2002-32428, Japanese Laid-open Patent Publication No. 2005-223120, and Japanese Laid-open Patent Publication No. 2006-172370 are examples of the related art.

SUMMARY

According to an aspect of the invention, a computer-readable recording medium having stored therein a program for causing a computer to execute a process for information processing comprising: performing, for a plurality of noise countermeasure design checks for a plurality of nets provided on a substrate, an initial noise countermeasure design check on each of the plurality of nets in an execution order determined, when one of the checks is passed, on the basis of other noise countermeasure design checks that may be skipped; and performing, if it is determined on the basis of at least a check result of a noise countermeasure design check which has been performed immediately before a corresponding check that there is a next noise countermeasure design check that may not be skipped in the execution order, the next noise countermeasure design check for each of the plurality of nets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a table illustrating the related art;

FIG. 2 is a table illustrating the related art;

FIG. 3 is a table illustrating a superior-and-subordinate relation of checks;

FIG. 8 is a table illustrating check results in an initial state;

FIG. 9 is a table illustrating example processing results of inner layer check;

FIG. 10 is a table illustrating check results in a second state;

FIG. 11 is a table illustrating check results in a third state;

FIG. 12 is a table illustrating check results in a fourth state;

FIG. 13 is a table illustrating check results in a fifth state thereof;

FIG. 14 is a table illustrating example tallying results of check results;

FIG. 15 is a table illustrating example sorting results of tallying results;

DESCRIPTION OF EMBODIMENTS

Figure 4:
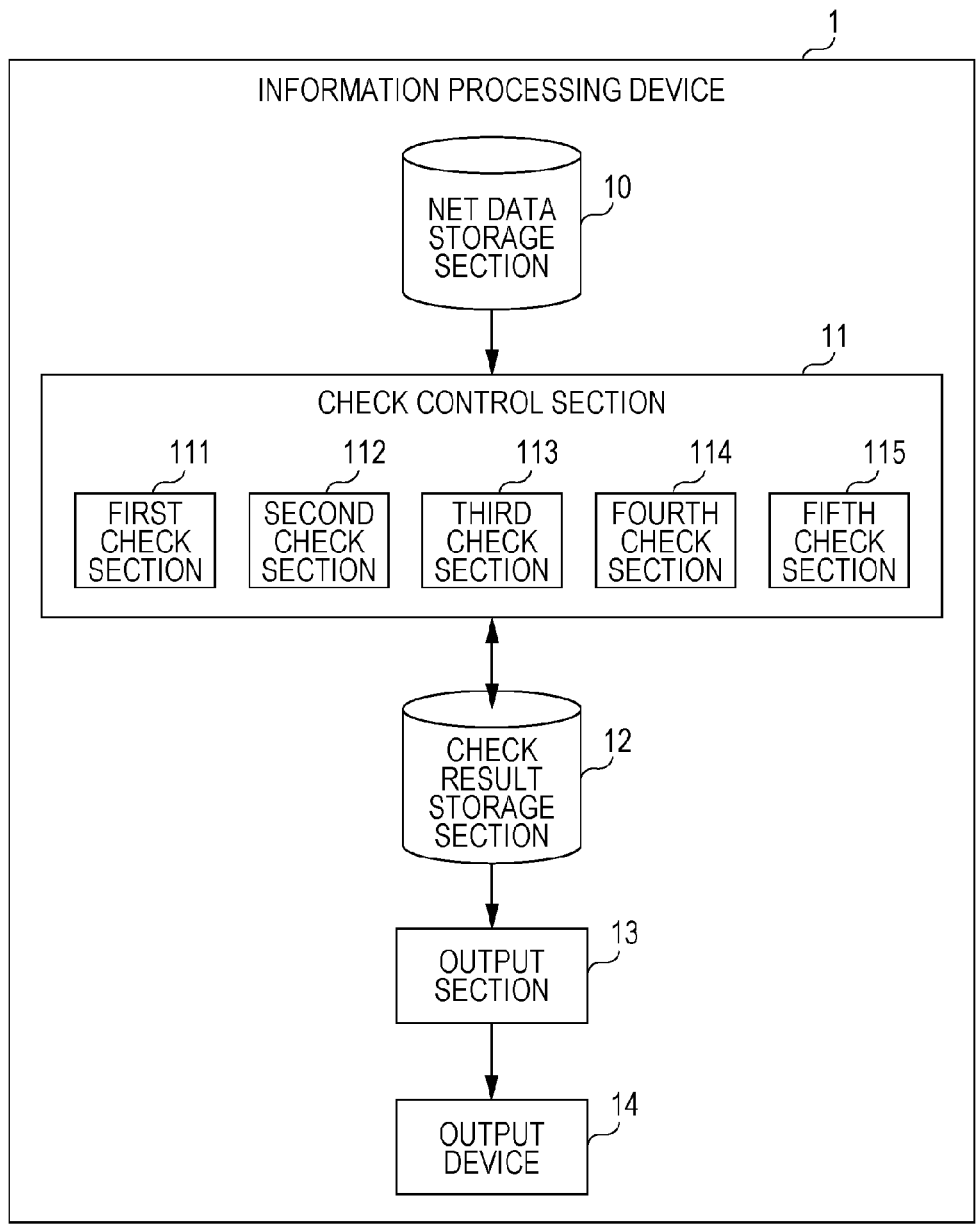
FIG. 4 is a function block diagram of an information processing device according to an embodiment.

In this embodiment, a case where checks of five items are performed is assumed. That is, (1) Check 1: internal layer pattern check (a check regarding how much of a net is disposed in an inner layer), (2) Check 2: surface pattern length check (a check regarding how much of a net appears on a substrate surface), (3) Check 3: countermeasure component distance check for a length to a countermeasure component (a check regarding a length between a semiconductor chip which generates noise and a countermeasure component), (4) Check 4: pattern guard check (a check regarding how much of a left or right side of a net is guarded), and (5) Check 5: substrate end check (a check regarding how close to a substrate end a net is disposed) are assumed.

In a case where the above-described checks are performed, when it is determined that there is no problem in Check 1, Check 2, 3, and 5 may be skipped. This is because since, when a greater part of a net is disposed in an inner layer, as compared to a standard level, the amount of radiation of electromagnetic waves is reduced, Checks 2 and 3 that are checks regarding electromagnetic waves radiated because the net is long may be skipped. Also, if a net is provided in an inner layer, the amount of radiation of electromagnetic waves is reduced even when the net is disposed in an end of a substrate, and thus, Check 5 may be also skipped.

Furthermore, if there is no problem in Check 2, because of advantages thereof, Checks 3 and 4 may be skipped. If there is no problem in Check 3, because of advantages thereof, Check 4 may be skipped. Furthermore, if there is no problem in Check 4, it is not likely that the amount of radiation of electromagnetic waves is increased even when the net is disposed in an end of the substrate, and thus, Check 5 may be skipped.

A superior-and-subordinate relation (also referred to as a precedence relation or a subordinate relation) of the checks on the basis of whether or not each of the checks may be skipped is illustrated in FIG. 3. That is, in FIG. 3, if it is determined that there is no problem in each of Checks 1 to 5 represented in rows, ones of Checks 1 to 5 represented in columns in which a x mark is indicated may be skipped, while ones of Checks 1 to 5 represented in columns in which a circle mark is indicated may not be skipped.

For Check 1, three checks may be skipped. For Check 2, two checks may be skipped. For Check 3, one check may be skipped. For Check 4, one check may be skipped. And, for Check 5, there is no check that may be skipped.

According to this embodiment, the checks are performed in a descending order of the number of other checks that may be skipped. Thus, overall, the number of checks that may be skipped is increased. In other words, the checks are performed in an ascending order of the number of other checks that are not in a subordinate relation with each check.

According to this embodiment, as clearly understood from FIG. 3, Check 1, Check 2, Check 3, Check 4, and Check 5 are performed in this order.

Note that, for Check 3 and Check 4, the number of other checks that may be skipped is the same. In this case, the order is determined on the basis of the superior-and-subordinate relation of Check 3 and Check 4. That is, since, if there is no problem in Check 3, Check 4 does not have to be performed, Check 3 is performed in precedence to Check 4.

In FIG. 3, a "-" mark represents that there is a problem in a corresponding check. That is, the checks with the "-" mark are not skipped.

Note that, in general, the superior-and-subordinate relations for combinations of every two checks are sorted out and the checks are arranged in a descending order from the most superior one, thereby determining an execution order.

An example configuration of an information processing device 1 that performs the above-described checks is illustrated in FIG. 4. The information processing device 1 according to this embodiment includes a net data storage section 10, a check control section 11, a check result storage section 12, an output section 13, and an output device 14 such as a printing device, a display device, and so forth.

The net data storage section 10 stores data representing a component provided on a designed substrate, position coordinates of a net, and a connection relation, and the like.

The check control section 11 includes a first check section 111, a second check section 112, a third check section 113, a fourth check section 114, and a fifth check section 115. The first check section 111 performs processing for Check 1. The second check section 112 performs processing for Check 2. The third check section 113 performs processing for Check 3. The fourth check section 114 performs processing for Check 4. The fifth check section 115 performs processing for Check 5. The check control section 11 performs control for the check sections 111 to 115.

The check result storage section 12 stores a check result of each of the check sections. The output section 13 generates from the check results a list of nets on which an EMC countermeasure is to be performed and causes the output device 14 to output the list.

Next, contents of processing of the information processing device 1 will be described with reference to FIGS. 5 to 15. First, the check control section 11 causes the first check section 111 to perform inner layer check of Check 1 using data stored in the net data storage section 10 (Step S1).

Figure 6:
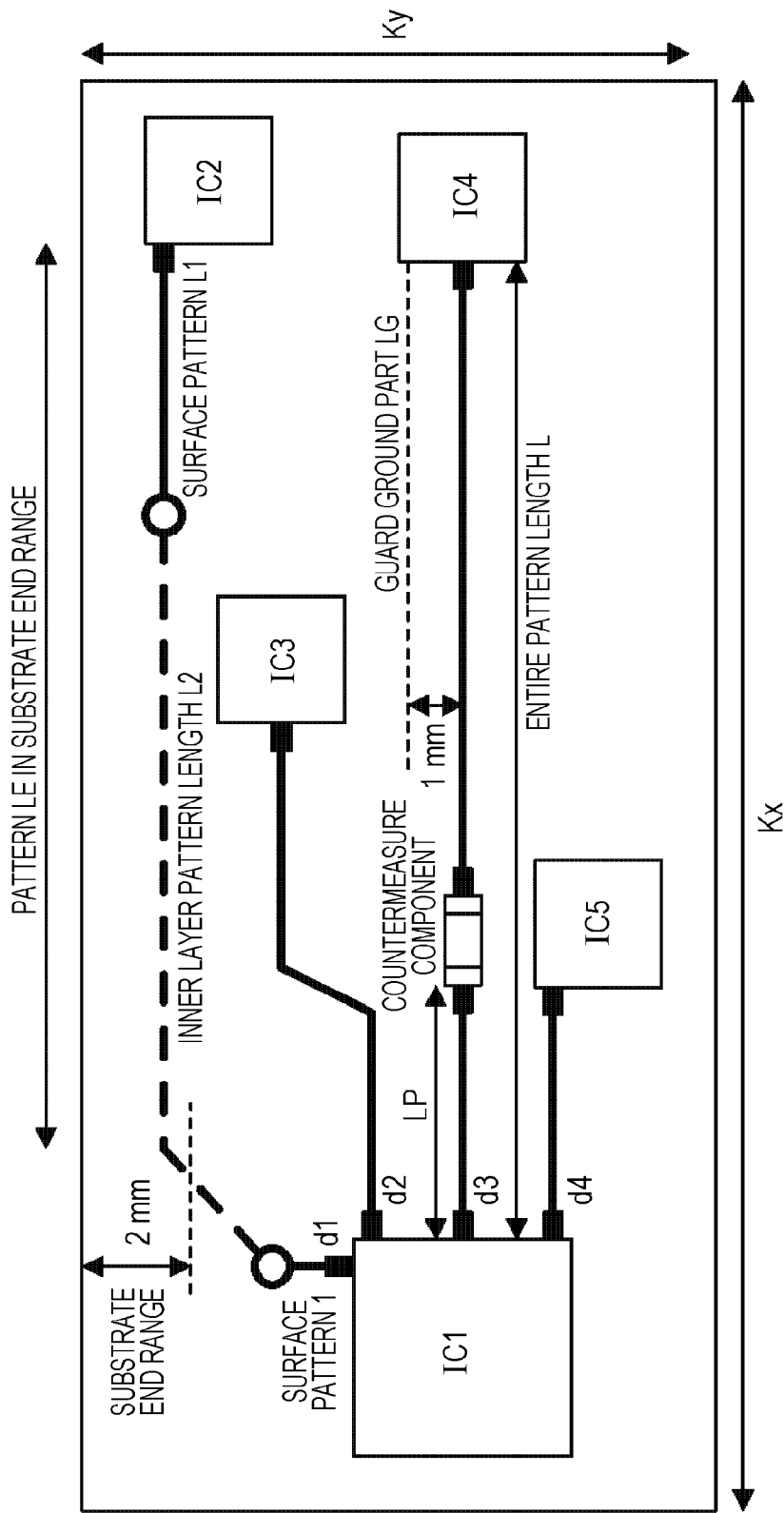
FIG. 6 is a diagram illustrating an example circuit board.

The inner layer check will be specifically described with reference to an example substrate of FIG. 6. The substrate of FIG. 6 is configured so that ICs 1 to 5 are provided on a substrate surface, and pins d1 to d4 of the IC 1 are output pins for a clock signal. A part of a net connecting the IC 1 and the IC 2 together is disposed in an inner layer and is represented by a dashed line. Nets connecting the IC 1 and the other ICs are not disposed in an inner layer but appear on a surface pattern.

Electromagnetic waves are radiated from a signal pattern. However, when upper and bottom surfaces of the signal pattern are sandwiched by wide patterns of a ground and a power source, the amount of radiation of electromagnetic waves is reduced. Therefore, for the net of the pin d1 of the IC1, assuming that a pattern length of a pattern of a part of the net disposed in the inner layer is represented by L2 and a pattern length of a surface pattern is represented by L1, an exposed surface ratio $W1=L1/(L1+L2)$ is calculated in the inner layer check. In the example of FIG. 6, $W1=0.2$ is obtained. For the pins d2 and d4, $W1=1$ is obtained.

Figure 7:
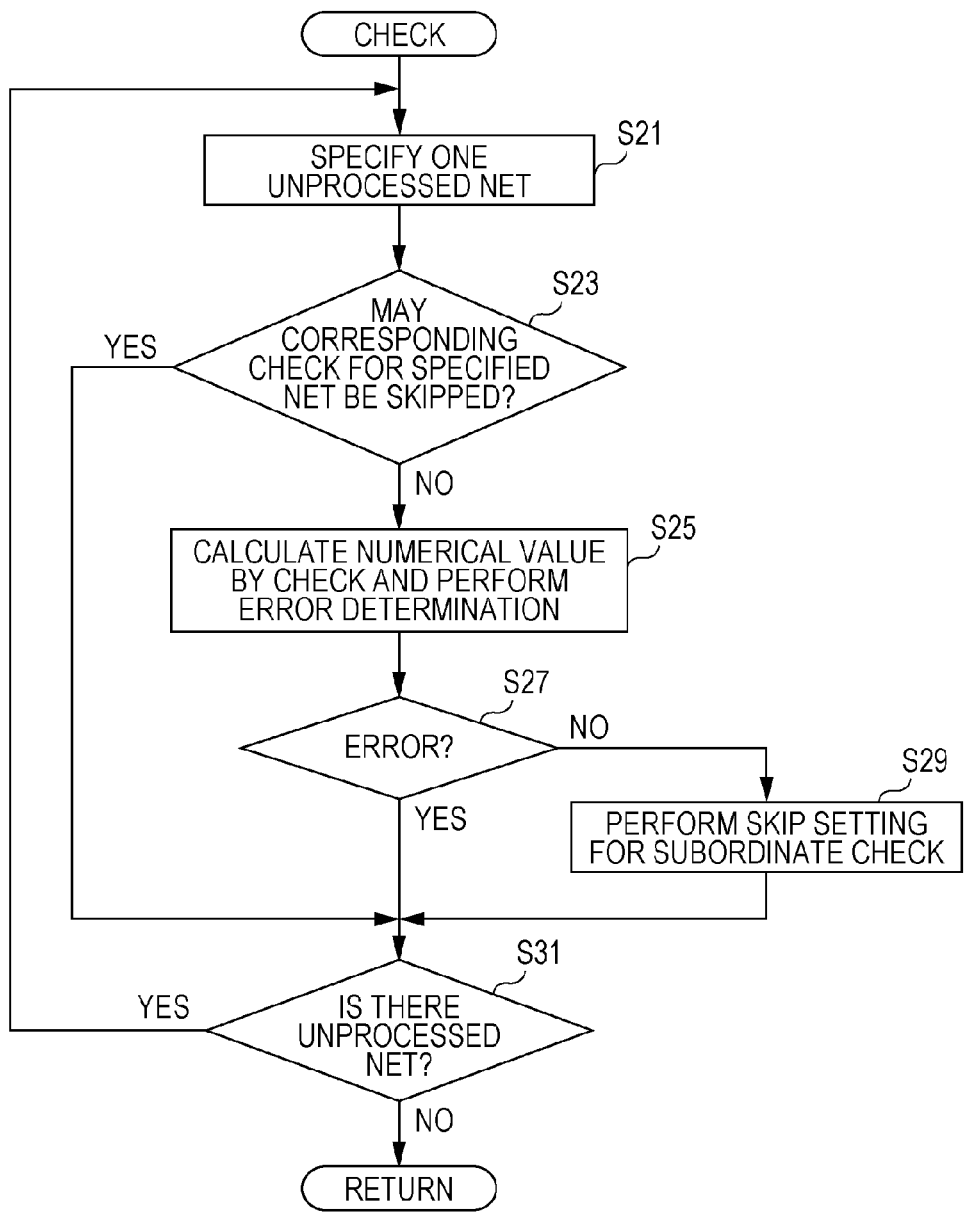
FIG. 7 is a flowchart illustrating specific processing for check.

Note that a basic process flow from Step S1 to S9 is illustrated in FIG. 7. Note that the check control section 11 prepares, from the list of nets stored in the net data storage section 10, a table illustrated in FIG. 8 in the check result storage section 12. In an example of FIG. 8, NETs 001 to 007 are provided as nets, and check results are registered in columns of Checks 1 to 5. Note that, for check results, a numerical value expressed as a dimensionless number, that is, a ratio or a percentage, is calculated so that numerical values may be summed up for each net at an end.

Each of the check sections specifies one unprocessed net among the nets registered in the table of the check result storage section 12 (Step S21 in FIG. 7). Each of the check sections determines whether or not a corresponding check may be skipped for the specified net (Step S23). For example, in the table of FIG. 8, determination is performed such that, when the numerical value is not registered, the check may not be skipped and, when the numerical value is registered, the check may be skipped. A reason for this is that, as will be described below, if there is no error in a current check result, "0" (%) is registered for a check that may be skipped in accordance with the superior-and-subordinate relation of the checks illustrated in FIG. 5.

Figure 5:
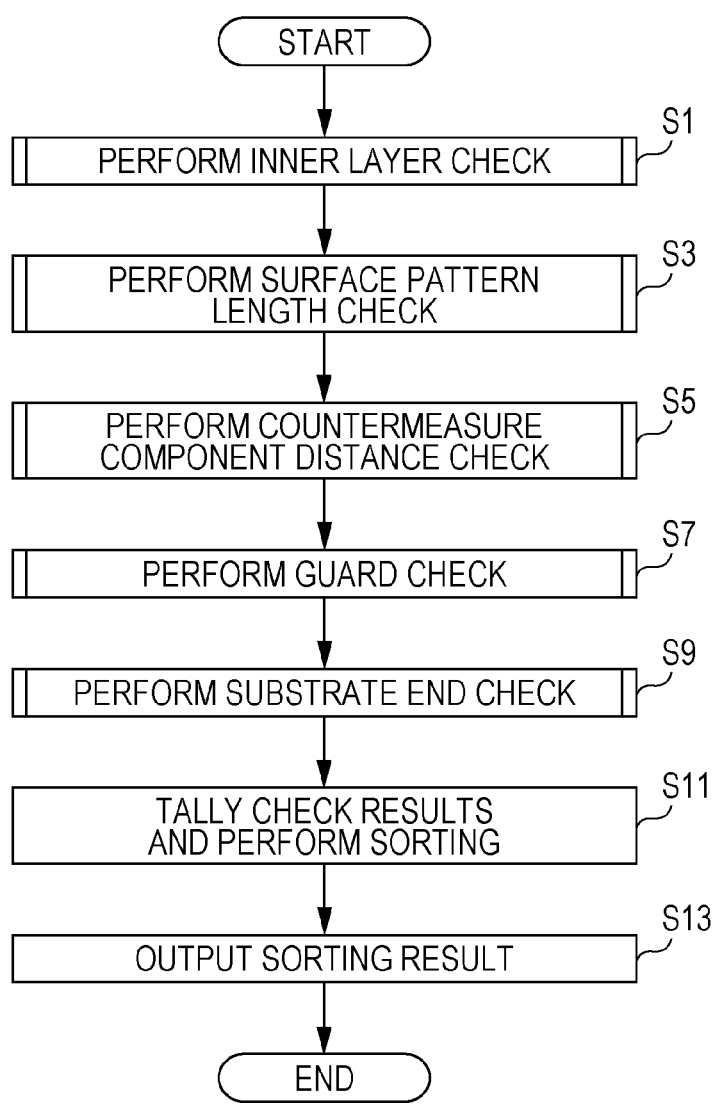
FIG. 5 is a flowchart illustrating a major process flow performed by the information processing device.

It may be determined whether or not a corresponding check may be skipped on the basis of the superior-and-subordinate relation of the checks illustrated in FIG. 5 and at least a check result of a check for the specified net performed immediately before a current check. Although it is determined that the inner layer check may not be skipped, it is determined that, if it is determined that there is no error in the inner layer check, the surface pattern length check (Check 2) may be skipped and, if it is determined that there is an error in the inner layer check, the surface pattern length check may not be skipped.

When the corresponding check may be skipped, the process moves to Step S31. On the other hand, when the corresponding check may not be skipped, each of the check sections calculates a numerical value by a check using a positional information and the like for the nets stored in the net data storage section 10 and compares the obtained numerical value to a threshold that has been set in advance to perform error determination, and then, stores the calculated numerical value and a determination result as check results in the check result storage section 12 (Step S25).

A numerical value W1 for the internal layer check is calculated using the method described with reference to FIG. 6, and it is determined, if the numerical value W1 is equal to or smaller than the threshold, that there is no problem and, if the numerical value W1 is more than the threshold, that there is an error.

If it is determined that there is an error (YES in Step S27), the process moves to Step S31. On the other hand, if it is determined that there is no error (NO in Step S27), each of the check sections performs skip setting for subordinate checks of the corresponding check in the superior-and-subordinate relation on the table in the check result storage section 12 (Step S29). That is, as described above, "0" (%) is set as a check result of a check that may be skipped. Then, the process moves to Step S31. Specifically, for Check 2, Check 3, and Check 5, "0" (%) is set as skip setting.

In Step S31, each of the check sections determines whether or not there is an unprocessed net in the table of the check result storage section 12 (Step S31) and, if there is an unprocessed net, the process returns to Step S21. On the other hand, if there is no unprocessed net, the process returns to a previous step.

When processing for the inner layer check is performed, for example, a table illustrated in FIG. 9 is generated in the check result storage section 12. In an example illustrated in FIG. 9, for NET 001, NET 002, NET 006, and NET 007, the check results are less than the threshold of 40%. Thus, it is determined that there is no problem (OK) in the inner layer check. On the other hand, for NET 003, NET 004, and NET 005, the check results are greater than the threshold of 40%, and thus, it is determined that there is an error. For NET 001, NET 002, NET 006, and NET 007, which have been determined to be OK, Check 2, Check 3 and Check 5 may be skipped, and "0"% is registered for each of Check 2, Check 3 and Check 5, thus allowing skip of Check 2, Check 3 and Check 5.

Returning to the processing of FIG. 5, the check control section 11 causes the second check section 112 to perform the surface pattern length check using the data stored in the net data storage section 10 (Step S3).

The surface pattern length check will be specifically described with reference to the example substrate illustrated in FIG. 6. The greater a pattern length of a signal pattern as a noise source is, the greater amount of electromagnetic wave is radiated. However, the pattern length is limited depending on the size of the substrate, and thus, the ratio W2 of the pattern length to a length of the substrate in a longitudinal direction thereof is adopted as an evaluation index. That is, assuming that a total length of a pattern exposed on a surface is represented by L and a length in a longitudinal direction of a substrate size Kx×Ky is represented by KMAX (Kx in the example of FIG. 6), the surface pattern length ratio is expressed by W2=L/KMAX. In the example of FIG. 6, for example, W2 of the net of the pin d1 is 0.2, W2 of the net of the pin d2 is 0.5, W2 of the net of the pin d3 is 0.65, and W2 of the net of the pin d4 is 0.1.

The second check section 112 also performs processing illustrated in FIG. 7. However, in Step S23, for the nets for which "0"% is not registered on the basis of a check result immediately before the current check in the example of FIG. 9, it is determined that the current check may not be skipped, and the pattern length check is performed. For the pattern length check, whether or not the check may be skipped is determined on the basis of a check result of a check performed immediately before the pattern length check (a check result of the inner layer check).

In Step S29, since Check 3 and Check 4 may be skipped in accordance with the superior-and-subordinate relation illustrated in FIG. 3, if there is no problem (that is, if the check is passed) in the pattern length check, "0" (%) is set as skip setting for Check 3 and Check 4.

For example, as illustrated in FIG. 10, the pattern length check is performed for NET 003, NET 004, and NET 005 in accordance with the result of the inner layer check. In an example of FIG. 10, for NET 003, the surface pattern length ratio W2 that is less than the threshold of 40% is obtained. Thus, it is determined that there is no problem, and "0" (%) is registered as skip setting for Check 3 and Check 4. For NET 004 and NET 005, the surface pattern length ratio W2 that is greater than the threshold of 40% is obtained, and thus, it is determined that there is a problem.

Next, the check control section 11 performs countermeasure component distance check on the third check section 113 using the data stored in the net data storage section 10 (Step S5).

The countermeasure distance check will be specifically described with reference to the example substrate of FIG. 6.
(A) Clock Signal Case Electromagnetic waves are radiated from a clock signal. However, if a countermeasure component is provided, the amount of radiation of electromagnetic waves is reduced. Moreover, the smaller a distance of the countermeasure component from an output pin of a clock is, the smaller amount of electromagnetic wave is radiated. Therefore, evaluation is performed using a ratio W3 of a distance LP from a clock output pin of an IC to a countermeasure component to a total length L. That is, W3=LP/L is used. Note that, if no countermeasure component is provided, the distance LP from a clock output pin of an IC to a countermeasure component is the entire pattern length L. Assuming that the pins of the IC of FIG. 6 are clock output pins, W3 for the output pin d1 is 1, W3 for the output pin d2 is 1, W3 for the output pin d3 connected to a countermeasure component is 0.15, and W3 for the output pin d4 is 1.

(B) Reset Signal Case

A reset signal does not cause radiation of electromagnetic waves, but might cause a malfunction when it receives noise externally inputted thereto. The risk that a malfunction is caused increases, as the length of a pattern increases. However, by disposing a countermeasure component at a close position to an input pin of an IC, a pattern of a part that receives noise is reduced, and therefore, the risk W3 is represented by the ratio of the distance LP from an input pin of an IC to a countermeasure component to the entire pattern length L. In this case, if no countermeasure component is provided, the distance LP from a clock input pin of an IC to a countermeasure component is the entire pattern length L. Assuming that the pins of the IC of FIG. 6 are reset input pins, W3 for the input pin d1 is 1, W3 for the input pin d2 is 1, W3 for the input pin d3 connected to a countermeasure component is 0.15, and W3 for the input pin d4 is 1.

The third check section 113 also performs the processing illustrated in FIG. 7. However, in Step S23, for the nets for which "0"% is not registered on the basis of an initial check result and a check result immediately before the current check in the example of FIG. 10, it is determined that the current check may not be skipped, and the countermeasure component distance check is performed.

In Step S29, since Check 4 may be skipped in accordance with the superior-and-subordinate relation illustrated in FIG. 3, if there is no problem (that is, if the check is passed) in the countermeasure distance check, "0" (%) is set as skip setting for Check 4.

For example, as illustrated in FIG. 11, the countermeasure component distance check is performed for NET 004 and NET 005 on the basis of check results of the inner layer check and the surface pattern length check. In an example illustrated in FIG. 11, for NET 004, the countermeasure component distance ratio W3 that is less than the threshold of 40% is obtained. Thus, it is determined that there is no problem, and "0" (%) is registered as skip setting for Check 4. For NET 005, the countermeasure component distance ratio W3 that is greater than the threshold of 40% is obtained, and thus, it is determined that there is a problem.

Next, the check control section 11 causes the fourth check section 114 to perform guard check using the data stored in the net data storage section 10 (Step S7).

The guard check will be specifically described with reference to the example substrate illustrated in FIG. 6.

Electromagnetic waves are radiated from a signal pattern. However, when a via or a pattern of a ground (referred to as a guard ground) is provided on each of both left and right sides of the pattern or on one of the right and left sides of the pattern so as to be located in the vicinity of the pattern, the amount of radiation of electromagnetic waves is reduced. Therefore, the greater the length of a part in which the guard ground is not provided is, the greater amount of electromagnetic wave is radiated. Thus, a non-guarded part ratio W4 is represented by the ratio of the part in which the guard ground is not provided to the entire pattern length L. That is, assuming that a part in which the guard ground is disposed within a certain distance (of, for example, 1 mm) is represented by LG, W4=(L−LG)/L is obtained. In the example illustrated in FIG. 6, since the guard ground is provided for the net of the pin d3, W4 of the pin d1 is 1, W4 of the pin d2 is 1, W4 of the pin d3 is 0.5, and W4 of the pin d4 is 1.

The fourth check section 114 also performs the processing illustrated in FIG. 7. However, in Step S23, for the nets for which "0"% is not registered on the basis of check results of three checks that have been already performed in the example of FIG. 11, it is determined that the current check may not be skipped, and the guard check is performed.

In Step S29, since Check 5 may be skipped in accordance with the superior-and-subordinate relation illustrated in FIG. 3, if there is no problem in the guard check, "0" (%) is set as skip setting for Check 5.

For example, as illustrated in FIG. 12, the guard check is performed for NET 001, NET 002, NET 005, NET 006, and NET 007 on the basis of the check results of the previously performed checks. In an example of FIG. 12, for NETs other than NET 005, the non-guarded part ratio W4 that is less than the threshold of 40% is obtained. Thus, it is determined that there is no problem, and "0" (%) is going to be set for Check 5. However, "0"% has been already set, and thus, setting of "0"% is not performed at this point. On the other hand, for NET 005, the non-guarded part ratio W4 that is greater than the threshold of 40% is obtained, and thus, it is determined that there is a problem.

Next, the check control section 11 causes the fifth check section 115 to perform substrate end check using the data stored in the net data storage section 10 (Step S9).

The substrate end check will be specifically described with reference to the example substrate illustrated in FIG. 6.

When a signal pattern is disposed near a substrate end, a ground area located immediately under the signal is in shortage, and the amount of radiation of electromagnetic waves is increased. Evaluation is performed using a substrate end ratio represented by the ratio W5, that is, a total length LE of parts located close to a substrate end (for example, a length of the substrate in a longitudinal direction thereof x 0.01 is a length of a part disposed within a range of 2 mm) to the entire pattern length L. That is, calculation is performed using W5=LE/L. In the example of FIG. 6, for example, W5=0.85 is obtained for the net of the pin d1, W5=0% is obtained for the net of the pin d2, W5=0% is obtained for the net of the pin d3, and W5=0% is obtained for the net of the pin d4.

The fifth check section 115 also performs the processing illustrated in FIG. 7. However, in Step S23, for the nets for which "0"% is not registered on the basis of check results of four checks that have been already performed in the example of FIG. 12, it is determined that the current check may not be skipped, and the substrate end check is performed.

In Step S29, there is no more subordinate check, and therefore, no special processing is performed.

For example, as illustrated in FIG. 13, the substrate end check is performed for NET 003, NET 004, and NET 005 on the basis of the check results of the previously performed checks. In an example of FIG. 13, for NETs other than NET 003, the substrate end ratio that is less than the threshold of 40% is obtained. Thus, it is determined that there is no problem. On the other hand, for NET 003, the substrate end ratio that is greater than the threshold of 40% is obtained, and thus, it is determined that there is a problem.

Then, the output section 13 tallies up check results stored in the check result storage section 12 and sorts the tallying results in a descending order (Step S11). In this embodiment, a numerical value of a dimensionless number is calculated for each check, and therefore, the numerical values calculated as check results may be summed up. When tallying is performed for the example of FIG. 13, tallying results are as illustrated in FIG. 14. Since EMC countermeasure is to be performed in precedence on a net with a larger sum, the nets are sorted in a descending order of obtained numeral values, and results illustrated in FIG. 15 are obtained. In an example of FIG. 15, the order of NET 005, NET 004, NET 003, NET 006, NET 007, NET 001, and NET 002 is obtained.

The output section 13 outputs sorting results to the output device 14 and the like (Step S13). There are cases where the output section 13 outputs sort results to another computer connected to a network.

Thus, the number of checks that are to be actually executed may be reduced, and a processing time may be reduced.

Figure 16:
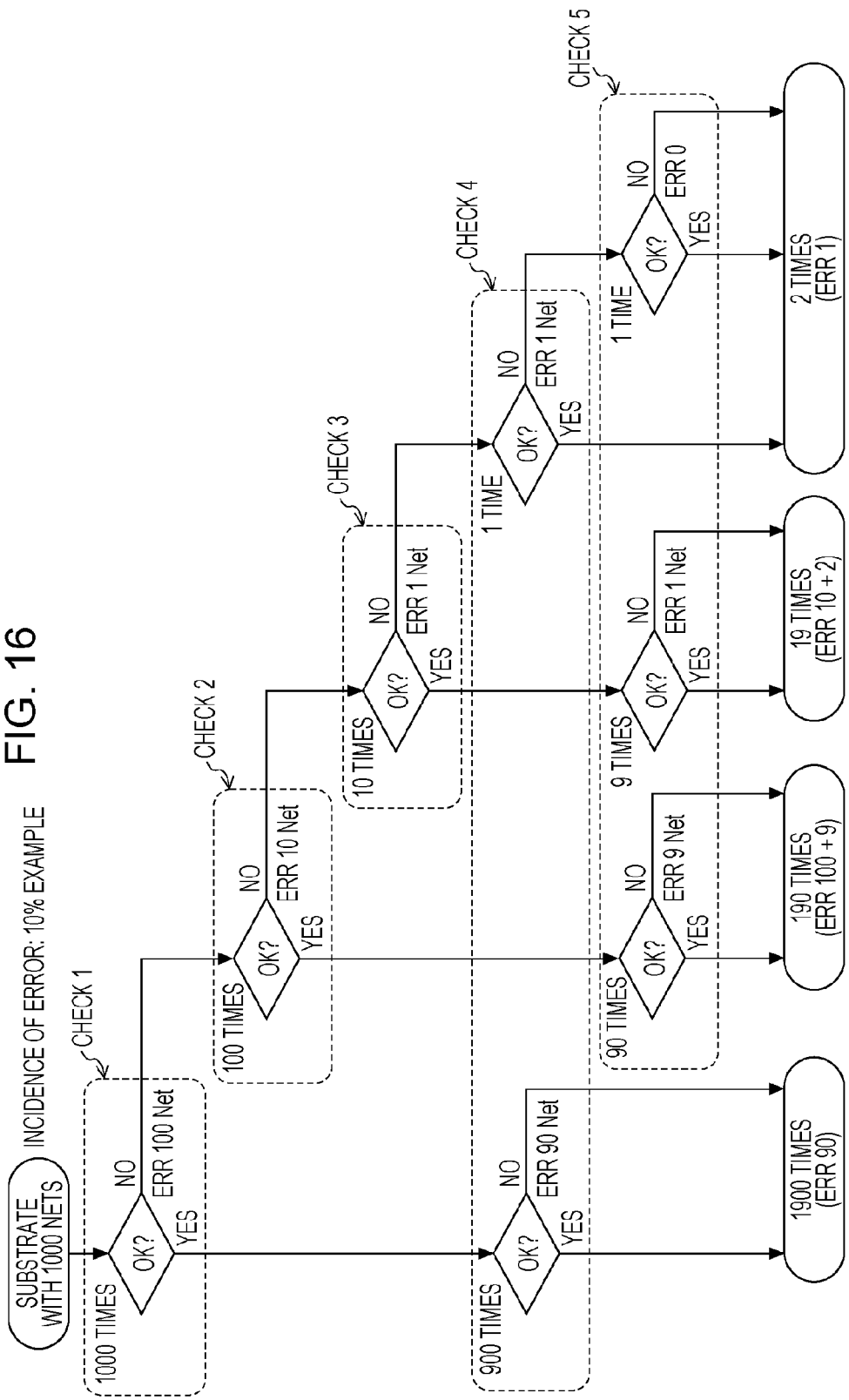
FIG. 16 is a diagram illustrating advantages of an embodiment.

For example, assume that checks are performed on a substrate with 1000 nets and an error occurs at a rate of 10% in each check. According to the related art, when five checks are conducted, 5000 times of checks are performed. On the other hand, according to this embodiment, as illustrated in FIG. 16, only Check 4 may be performed on 900 nets of 1000 nets on which Check 1 has been performed. On the other hand, only Check 5 may be performed on 90 nets of 100 nets for which it has been determined that there is an error in Check 1. Furthermore, only Check 5 may be performed on 9 nets of 10 nets for which it has been determined that there is an error in Check 2. On the other hand, assume that Check 4 and Check 5 are performed on one net for which it has been determined that there is an error in Check 3. Thus, only 2111 times of checks in total are performed, and 2889 times of checks are skipped in this example.

Figure 17:
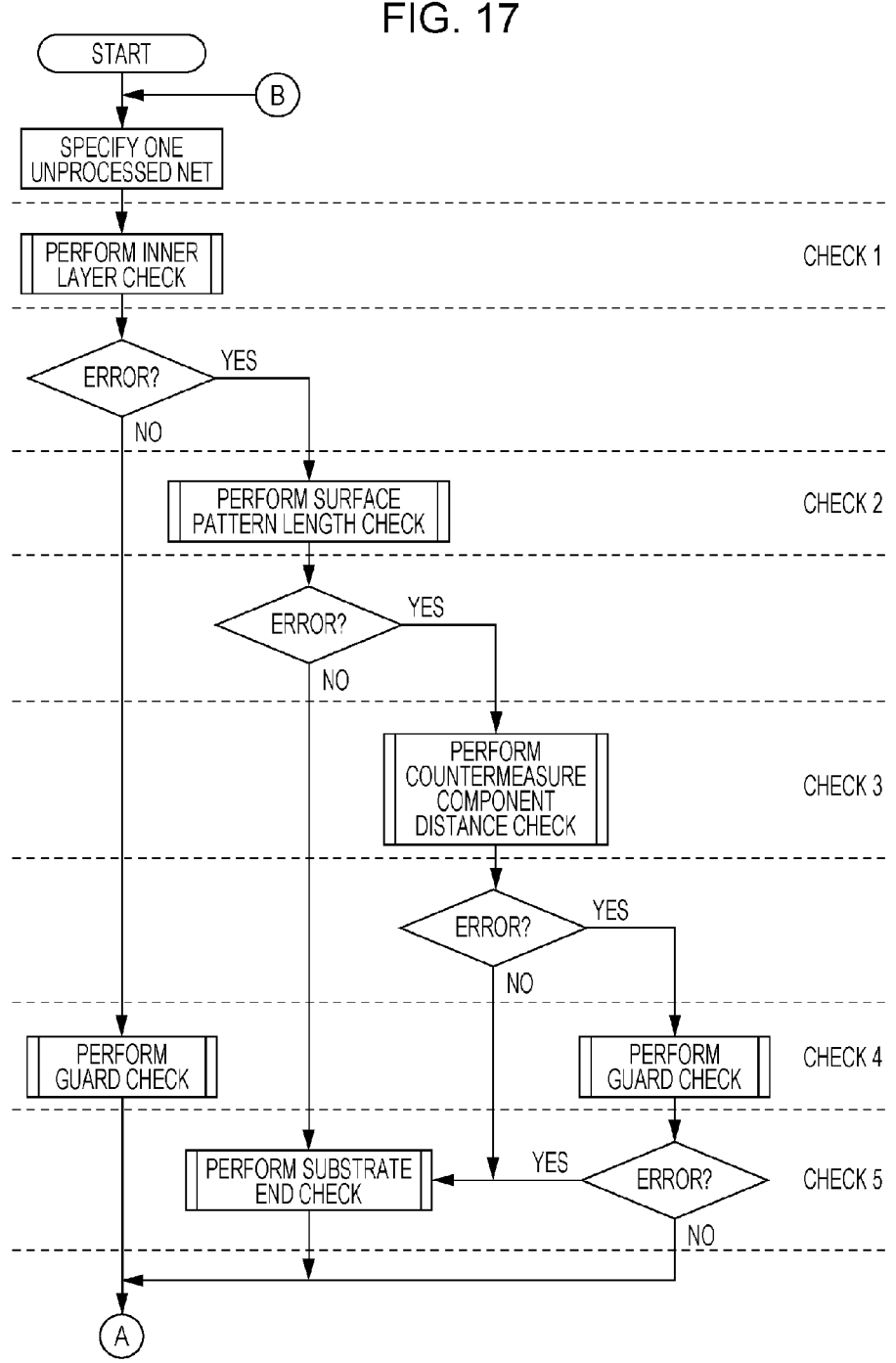
FIG. 17 is a flowchart illustrating a process flow according to another embodiment.
Figure 18:
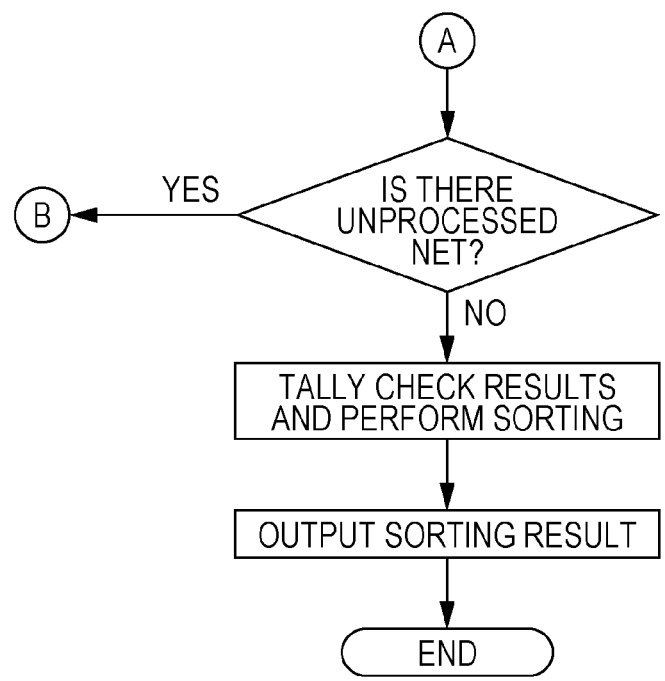
FIG. 18 is a flowchart illustrating a process flow according to still another embodiment.

An embodiment of the present technology has been described above. However, the present technology is not limited thereto. For example, the function block diagram illustrated in FIG. 4 is merely an example, and does not necessarily correspond to an actual program module configuration. Also, the process flow may be modified as long as processing results are not changed. For example, in the above-described example, the process flow in which after Check 1 is performed on all the nets, Check 2 is performed on corresponding nets, Check 3 is performed on corresponding nets, Check 4 is performed on corresponding nets, and then, Check 5 is performed on corresponding nets has been described. However, after Check 1 is performed on one net, a next check may be immediately performed on the net in accordance with a check result of Check 1 for the net. For example, if there is an error in Check 1, Check 2 is performed and, if Check 2 is passed, Check 5 is performed. Even when, after Check 5 for the net is completed, similar processing is performed on a next net, similar results may be obtained. In this case, processing is performed following a process flow illustrated in FIG. 17 and FIG. 18. That is, in the process flow, a loop for each net is provided outside and, for each net, an inner layer check is performed first, and subsequent checks are performed such that, on the basis of a check result immediately before a current check, a next check that may not be skipped in a basic execution order (that is, the order of Checks 1, 2, 3, 4, and 5) is performed.

If it is determined that there is no problem in the inner layer check, the guard check, that is, Check 4, which may not be skipped is performed, and the process moves to processing for a next net. If it is determined that there is a problem in the inner layer check, the surface pattern length check is performed following the execution order and, if it is determined that there is no problem in the surface pattern length check, the substrate end check, that is, Check 5, which may not be skipped, is performed, and the process moves to processing for a next net. If it is determined that there is a problem in the surface pattern length check, the countermeasure component distance check is performed following the execution order and, if it is determined that there is no problem in the countermeasure component distance check, the substrate end check, that is, Check 5, which may not be skipped, is performed, and the process moves to processing for a next net.

On the other hand, if it is determined that there is a problem in the countermeasure component distance check, the guard check is performed following the execution order and, if it is determined that there is no problem in the guard check, the process moves to processing for a next net. If it is determined that there is a problem in the guard check, the substrate end check is performed following the execution order, and the process moves to processing for a next net. Thus, instead of determining whether or not each check is desired, whether to execute each check may be incorporated in a logic.

Furthermore, in some cases, the information processing device 1 is implemented by a single computer while, in other cases, the information processing device 1 is implemented by a plurality of computers. Moreover, the information processing device 1 may be implemented not only as a stand-alone type device, but also may be implemented as a server-client type device. That is, the information processing device 1 may be configured to perform, in accordance with a request from a client computer connected to a network, the above-described processing on a server and send a processing result to the client computer.

Although an example where the same threshold is used for each check has been described above, there are cases where different thresholds are set for different checks.

Figure 19:
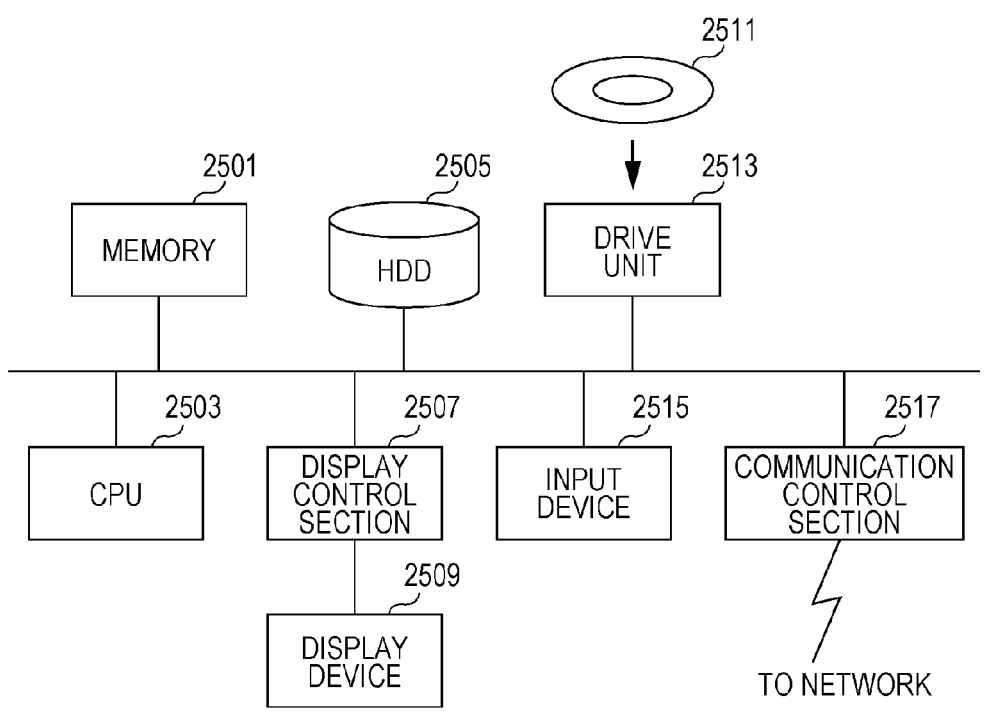
FIG. 19 is a function block diagram of a computer.

Note that the information processing device 1 is a computer device and, as illustrated in FIG. 19, a memory 2501, a central processing unit (CPU) 2503, a hard disk drive (HDD) 2505, a display control section 2507 connected to a display device 2509, a drive unit 2513 for a removable disk 2511, an input device 2515, and a communication control section 2517 configured to connect a network are connected via a bus 2519. An operating system (OS) and an application program used for performing the processing of this embodiment are stored in the HDD 2505, and are read from the HDD 2505 to the memory 2501 when being executed by the CPU 2503. The CPU 2503 controls, in accordance with contents of the processing of the application program, the display control section 2507, the communication control section 2517, and the drive unit 2513 to cause them to perform predetermined operations. Data which is being processed is mainly stored in the memory 2501, but may be stored in the HDD 2505. According to this embodiment, the application program used for performing the above-described processing is stored in the computer-readable removal disk 2511 to be distributed, and is installed from the drive unit 2513 to the HDD 2505. There are also cases where the application program is installed to the HDD 2505 via a network such as the Internet and the communication control section 2517. In such a computer device, a hardware such as the CPU 2503, the memory 2501, and so forth, an OS, and a program such as the above-described application program, organically cooperate with one another to realize the above-described various functions.

The above-described embodiment will be summarized as follows.

An information processing method according to this embodiment includes (A) processing of performing, for a plurality of noise countermeasure design checks for a plurality of nets provided on a substrate, an initial noise countermeasure design check on each of the plurality of nets in an execution order determined, when one of the checks is passed, on the basis of other noise countermeasure design checks that may be skipped, and (B) processing of performing, if it is determined on the basis of at least a check result of a noise countermeasure design check which has been performed immediately before a corresponding check that there is a next noise countermeasure design check that may not be skipped in the execution order, the next noise countermeasure design check for each of the plurality of nets.

Thus, the overall number of checks may be reduced, and a processing time may be reduced.

Note that the plurality of noise countermeasure design checks described above may include a first check regarding a net provided in an inner layer, a second check regarding a substrate surface pattern length, a third check regarding a noise countermeasure component, a fourth check regarding a guard pattern, and a fifth check regarding a distance from a substrate end. In this case, the execution order of the checks may be the first check, the second check, the third check, the fourth check, and the fifth check. For the first check, other noise countermeasure design checks that may be skipped may be the second check, the third check, and the fifth check. For the second check, other noise countermeasure design checks that may be skipped may be the third check and the fourth check. For the third check, another noise countermeasure design check that may be skipped may be the fourth check. And, for the fourth check, another noise countermeasure design check that may be skipped may be the fifth check.

As described above, there is the superior-and-subordinate relation depending on whether or not each check may be skipped, and checks may be efficiently performed by setting the execution order in accordance with the superior-and-subordinate relation.

Also, each of check results of the plurality of noise countermeasure design checks may be represented by a dimensionless number, the check results of the plurality of noise countermeasure design checks may be added together, and the plurality of nets may be sorted in a descending order of a value representing the sum of check results. Thus, the plurality of net may be comprehensively compared.

Furthermore, a threshold may be set for each of the plurality of noise countermeasure design checks, and whether or not each of the plurality of noise countermeasure design checks is passed may be determined on the basis of whether or not each check result exceeds a corresponding threshold.

Furthermore, in the above-described first check, the ratio of the length of a part of a pattern of a net exposed on a surface layer to the total length of the pattern may be calculated.

Also, in the above-described second check, the ratio of the length of a part of a pattern exposed on a surface layer to the length of a substrate in a longitudinal direction thereof may be calculated.

Furthermore, in the above-described third check, the length of a pattern of a net disposed between a countermeasure component and a device that is affected by noise to the total length of the pattern may be calculated.

Furthermore, in the above-described fourth check, the ratio of the length of a part of a net in which no guard pattern is provided on a left or a right side of the net to the total length of the pattern may be calculated.

Furthermore, in the above-described fifth check, the ratio of the total length of parts of a net pattern disposed within a range of a certain distance from an end of the substrate to the total length of the pattern may be calculated.

Note that a program that causes a computer to perform the above-described processing may be produced, and the program may be stored in a computer-readable memory medium or memory device such as, for example, a flexible disk, an optical disk such as a CD-ROM and so forth, a magnetic optical disk, a semiconductor memory (for example, a ROM), a hard disk, and so forth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program to cause a computer to execute a process comprising:
    performing an initial noise countermeasure design check on a plurality of nets provided on a substrate; and
    selectively performing one or more of a plurality of additional noise countermeasure design checks based on a result of the performing the initial noise countermeasure design check wherein:
    the plurality of noise countermeasure design checks include a first check regarding a net provided in an inner layer, a second check regarding a substrate surface pattern length, a third check regarding a noise countermeasure component, a fourth check regarding a guard pattern, and a fifth check regarding a distance from a substrate end;
    when the first check is the initial noise countermeasure design check the execution order of the checks is the first check, the second check, the third check, the fourth check, and the fifth check;
    if the first check is successful, the second check, the third check, and the fifth check are omitted;
    if the second check is successful, the third check and the fourth check are omitted;
    if the third check is successful, the fourth check is omitted; and
    if the fourth check is successful, the fifth check is omitted.

2. The non-transitory computer-readable recording medium according to claim 1,
    wherein, in the first check, a ratio of a length of a part of a pattern of one of the plurality of nets exposed on a surface layer to a total length of the pattern is calculated.

3. The non-transitory computer-readable recording medium according to claim 1,
    wherein, in the second check, a ratio of a length of a part of a pattern exposed on a surface layer to a length of the substrate in a longitudinal direction thereof is calculated.

4. The non transitory computer-readable recording medium according to claim 1,
    wherein, in the third check, a length of a pattern of a net disposed between a countermeasure component and a device that is affected by noise to a total length of the pattern is calculated.

5. The non-transitory computer-readable recording medium according to claim 1,
    wherein, in the fourth check, a ratio of a length of a part of a net in which no guard pattern is provided on a left or a right side of the net to a total length of the pattern is calculated.

6. The non-transitory computer-readable recording medium according to claim 1,
    wherein, in the fifth check, a ratio of a total length of parts of a net pattern disposed within a range of a certain distance from an end of the substrate to a total length of the pattern is calculated.

7. A non-transitory computer-readable recording medium having stored therein a program to cause a computer to execute a process comprising:
  performing an initial noise countermeasure design check on a plurality of nets provided on a substrate; and
  selectively performing one or more of a plurality of additional noise countermeasure design checks based on a result of the performing the initial noise countermeasure design check wherein:
  each of the selectively performing the plurality of noise countermeasure design checks produces a result represented by a dimensionless number; and
  the results of the plurality of noise countermeasure design checks are added together, and the plurality of nets are sorted in a descending order of a value representing a sum of check results.

8. The non-transitory computer-readable recording medium according to claim 7,
  wherein a threshold is set for each of the plurality of noise countermeasure design checks, further comprising
  determining whether each of the plurality of noise countermeasure design checks is passed on the basis of whether the result exceeds a corresponding threshold.

9. An information processing method for causing a computer to execute processing of:
  performing, using the computer, an initial noise countermeasure design check on a plurality of nets provided an a substrate; and
  selectively performing one or more of a plurality of additional noise countermeasure design checks based on a result of the performing the initial noise countermeasure design check, wherein:
  the plurality of noise countermeasure design checks include a first check regarding a net provided in an inner layer, a second check regarding a substrate surface pattern length, a third check regarding a noise countermeasure component, a fourth check regarding a guard pattern and a fifth check regarding the distance from a substrate end;
  when the first check is the initial noise countermeasure design check, the execution order of the checks is the first check, the second check, the third check, the fourth check and the fifth check:
  if the first check is successful, the second check, the third check, and the fifth check are omitted;
  if the second check is successful, the third check and the fourth check are omitted;
  wherein if the third check is successful, the fourth check is omitted;
  if the fourth check is successful, the fifth check is omitted.

10. An information processing device comprising:
  a data storage that stores data for a plurality of nets provided on a substrate; and
  a processor which is configured to:
    perform an initial noise countermeasure design check on the plurality of nets; and
    selectively perform one or more of a plurality of additional noise countermeasure design checks based on a result of the initial noise countermeasure design check which is performed, wherein:
  the plurality of noise countermeasure design checks include a first check regarding a net provided in an inner layer, a second check regarding a substrate surface pattern length, a third check regarding a noise countermeasure component, a fourth check regarding a guard pattern and a fifth check regarding the distance from a substrate end;
  when the first check is the initial noise countermeasure design check, the execution order of the checks is the first check, the second check, the third check, the fourth check and the fifth check:
  if the first check is successful, the second check, the third check, and the fifth check are omitted;
  if the second check is successful, the third check and the fourth check are omitted;
  if the third check is successful, the fourth check is omitted;
  if the fourth check is successful, the fifth check is omitted.

* * * * *